United States Patent [19]

Fukui et al.

[11] Patent Number: 5,547,478

[45] Date of Patent: Aug. 20, 1996

[54] COMPOSITIONS CONTAINING BENZODIFURANONE COMPOUNDS AND METHODS FOR DYEING HYDROPHOBIC MATERIALS USING THE SAME

[75] Inventors: Toshinori Fukui, Itami; Nobuyuki Katsuda, Ashiya; Shinichi Yabushita, Mishima-gun; Shuhei Hashizume, Osaka, all of Japan

[73] Assignee: Sumitomo Chemical Company, Limited, Osaka, Japan

[21] Appl. No.: 167,019

[22] Filed: Dec. 16, 1993

[30] Foreign Application Priority Data

Dec. 22, 1992 [JP] Japan .................... 4-342047

[51] Int. Cl.$^6$ .................... D06P 1/20; D06P 3/52; C07D 493/04
[52] U.S. Cl. .................... 8/643; 8/638; 8/675; 8/677; 8/678; 8/693; 8/694; 8/922; 8/578; 549/299; 544/153; 546/243
[58] Field of Search .................... 549/299; 8/578, 8/675, 643; 544/153; 546/243

[56] References Cited

U.S. PATENT DOCUMENTS

| | | | |
|---|---|---|---|
| 2,950,949 | 8/1960 | Schlach | 8/55 |
| 3,538,129 | 11/1970 | Sato et al. | 260/376 |
| 3,557,155 | 1/1971 | Yamada et al. | 260/373 |
| 4,872,882 | 10/1989 | Hahnke et al. | 8/638 |
| 5,077,416 | 12/1971 | Ueda et al. | 549/299 |
| 5,220,040 | 6/1993 | Mather et al. | 549/299 |

FOREIGN PATENT DOCUMENTS 397170  11/1990  European Pat. Off. .

OTHER PUBLICATIONS

A. H. M. Renfrew, Review of Progress in Coloration, "Reactive Dyes for Cellulose: Replacement of . . . ", pp. 15–20 vol. 15, 1985.

Primary Examiner—Ba Kim Trinh
Attorney, Agent, or Firm—Cushman Darby & Cushman, L.L.P.

[57] ABSTRACT

The invention is to provide a composition made by blending a benzodifuranone compound of the formula (I):

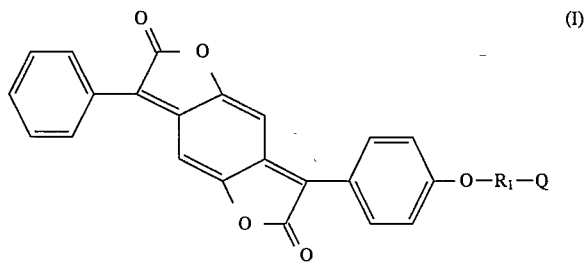

wherein $R_1$ represents a methylene or straight or branched $C_2$–$C_6$alkylene group optionally substituted with a hydroxy, $C_1$–$C_4$alkoxy or $C_1$–$C_4$alkylcarbonyloxy group; and Q represents 5- or 6-membered saturated or unsaturated heterocyclic ring residue, with an anthraquinone compound of the formula (II):

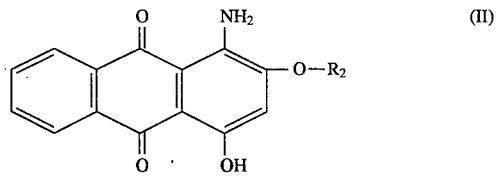

wherein $R_2$ represents an optionally substituted $C_1$–$C_6$alkyl, optionally substituted phenyl or $C_1$–$C_4$alkoxyphenylsulfonyl group, and a method for dyeing hydrophobic materials using the composition to obtain red dyed products with excellent pH dependency and fastnesses to light and washing.

8 Claims, No Drawings

COMPOSITIONS CONTAINING BENZODIFURANONE COMPOUNDS AND METHODS FOR DYEING HYDROPHOBIC MATERIALS USING THE SAME

The present invention relates to a composition containing benzodifuranone compounds, and to a method for dyeing hydrophobic materials using the same.

More particularly, the invention relates to a composition made by blending a red benzodifuranone compound with a red anthraquinone compound, and to an application of the composition to a dyeing method for hydrophobic materials.

With a consumers' trend toward higher grade clothings, disperse dyes with much excellent dyeability and fastness have been increasingly desired. Under such circumstances, hydrophobic fiber materials dyed with disperse dyes have come to be subjected to various after-finishing treatments, such as softening, antistatic and feel-improving finishings, and the like, to give the added values. These after-finishings are, however, carried out at relatively high temperatures, so that there are some problems, for example, in their dye bleeding, as well as the deterioration of wet fastness, particularly, washing fastness.

So far, many compounds, including azo compounds, have been proposed for the purpose of developing red dyes excellent in washing fastness on hydrophobic fiber materials. Most of them are not yet satisfactory because of the difficulties in that the washing fastness after the after-finishing is remarkably lowered.

A number of benzodifuranone compounds for dyeing or printing hydrophobic fibers have been proposed, for example, in Japanese Patent Unexamined [KOKAI] Publications Nos. 152567/1985, 109526/1977, 122869/1981, 14876/1991 (U.S. Pat. No. 5,077,416) and 72571/1991 (U.S. Pat. No. 5,424,455). These compounds are satisfactory in the washing fastness, but further improvements have been desired in their other fastnesses and dye characteristics.

To solve these problems, the present inventors have conducted extensive studies, and resultingly accomplished the present invention.

An object of the present invention is to provide a composition comprising at least one member selected from the benzodifuranone compound group represented by the following formula (I):

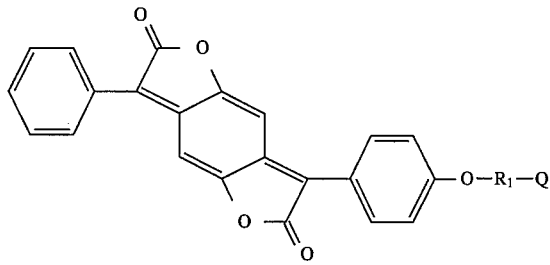

wherein $R_1$ represents a methylene, or straight or branched $C_2$–$C_6$alkylene group optionally substituted with a hydroxy, $C_1$–$C_4$alkoxy or $C_1$–$C_4$alkylcarbonyloxy group; and Q represents 5- or 6-membered saturated or unsaturated heterocyclic ring residue, and at least one member selected from the anthraquinone compound group represented by the following formula (II):

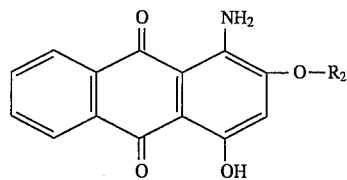

wherein $R_2$ represents an optionally substituted $C_1$–$C_6$alkyl, optionally substituted phenyl or $C_1$–$C_4$alkoxyphenylsulfonyl group.

Another object of the invention is to provide a method for dyeing hydrophobic materials comprising using said composition. Other objects will be apparent from the following descriptions.

The compounds represented by the above formula (I) may be selected from the group of known compounds as disclosed, for example, in Japanese Patent Unexamined [KOKAI] Publication No. 72571/1991 (U.S. Pat. No. 5,424,455).

Saturated heterocyclic ring residues represented by Q in the formula (I) include tetrahydrofuryl, tetrahydrothienyl, tetrahydropyranyl, pyrrolidyl, piperidyl, piperazyl, morpholyl and the like. Unsaturated heterocylic ring residues represented by Q include furyl, thienyl, pirolyl, pyridyl, pyranyl, thiazolyl, s-triazinyl and the like. These heterocyclic ring residues may be substituted with a halogen atom or a hydroxy, $C_1$–$C_4$alkyl, $C_1$–$C_4$alkoxy, $C_1$–$C_4$alkylcarbonyl, $C_1$–$C_4$alkoxycarbonyl, cyano, amino, or keto group. Among these residues, tetrahydro-furyl and tetrahydropyranyl groups optionally substituted with a $C_1$–$C_4$alkyl group, as well as morpholyl group, are preferably used. Specific examples of the compounds of formula (I) suitably employed in the invention are shown in the following Table 1.

TABLE 1

| Compound No. | $R_1$ | Q |
|---|---|---|
| (a)-1 | $CH_2$ | O (tetrahydrofuryl) |
| (a)-2 | $CH_2\overset{|}{C}HCH_2$ $OH$ | O (tetrahydropyranyl) |
| (a)-3 | $CH_2\overset{|}{C}HCH_2$ $OCH_3$ | O (tetrahydrofuryl) |
| (a)-4 | $C_3H_6$ | O (tetrahydrofuryl) |

TABLE 1-continued

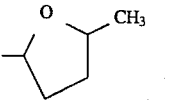

| Compound No. | $R_1$ | Q |
|---|---|---|
| (a)-5 | $CH_2$ | 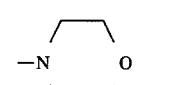 |
| (a)-6 | $\underset{\underset{OCOCH_3}{\mid}}{C_3H_6CHCH_2}$ | 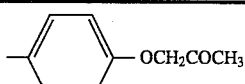 |

The substituents in "the optionally substituted $C_1$–$C_6$alkyl group" represented by $R_2$ in the formula (II) include a halogen atom, and hydroxy, phenyl, phenoxy, $C_1$–$C_4$alkoxy $C_1$–$C_4$alkoxy, aminophenylcarbonyloxy, phenoxycarbonyloxy, and $C_1$–$C_4$alkoxycarbonyloxy groups. The substituents in "the optionally substituted phenyl group" include a halogen atom, and $C_1$–$C_4$alkyl, $C_1$–$C_4$alkoxy, hydroxy, $C_1$–$C_4$alkoxycarbonyl, $C_1$–$C_4$alkoxycarbonyl $C_1$–$C_4$alkyl, oxopiperidino$C_1$–$C_4$alkyl, $C_1$–$C_4$alkylcarbonyl $C_1$–$C_4$alkoxy, $C_1$–$C_4$alkoxycarbonyl $C_1$–$C_4$alkoxy, hydroxy$C_1$–$C_4$alkylthio, phenyl$C_1$–$C_4$alkoxy, phenoxy$C_1$–$C_4$alkoxy, $C_1$–$C_4$alkoxy $C_1$–$C_4$alkylaminosulfonyl, and $C_1$–$C_4$alkylphenylsulfonyloxy groups.

The compounds represented by the formula (II) may be selected from the known compound group including those represented by C. I. Disperse Red 4, C. I. Disperse Red 55, C. I. Disperse Red 60, C. I. Disperse Red 92, C. I. Disperse Red 127, C. I. Disperse Red 146, C. I. Disperse Red 192, and C. I. Disperse Red 283, and those described in Japanese Patent Examined (KOKOKU) Publications Nos. 18179/1968 (U.S. Pat. No. 3,538,129) and 14118/1969 (U.S. Pat. No. 3,557,155) and Japanese Patent Unexamined (KOKAI) Publication No. 2681/1978. Specific examples of such compounds suitably employed in the invention are shown in the following Tables 2 and 3.

TABLE 2

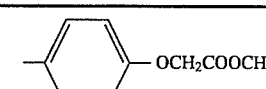

| Compound No. | $R_2$ |
|---|---|
| (b)-1 | 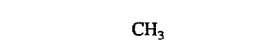 |

TABLE 2-continued

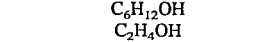

| Compound No. | $R_2$ |
|---|---|
| (b)-2 | 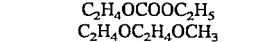 |
| (b)-3 | $CH_3$ |
| (b)-4 | $C_6H_{12}OH$ |
| (b)-5 | $C_2H_4OH$ |
| (b)-6 | $C_2H_4OCOOC_2H_5$ |
| (b)-7 | $C_2H_4OC_2H_4OCH_3$ |
| (b)-8 |  |
| (b)-9 | 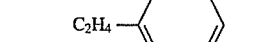 |
| (b)-10 |  |
| (b)-11 |  |
| (b)-12 | 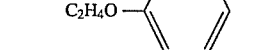 |
| (b)-13 |  |
| (b)-14 | 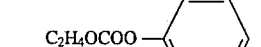 |
| (b)-15 |  |
| (b)-16 | 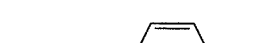 |
| (b)-17 | 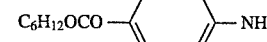 |

TABLE 2-continued

[Structure: anthraquinone with NH$_2$, O–R$_2$, OH substituents]

| Compound No. | R$_2$ |
|---|---|
| (b)-18 | –C$_6$H$_4$–OCOCH$_3$ |
| (b)-19 | –C$_6$H$_4$–SC$_2$H$_4$OH |

TABLE 3

| Compound No. | R$_2$ |
|---|---|
| (b)-20 | –C$_6$H$_4$–OC$_2$H$_4$–C$_6$H$_5$ |
| (b)-21 | –C$_6$H$_4$–OC$_2$H$_4$O–C$_6$H$_5$ |
| (b)-22 | –C$_6$H$_4$–CH$_2$–N(piperidinone) |
| (b)-23 | –C$_6$H$_4$–OSO$_2$–C$_6$H$_4$–CH$_3$ |
| (b)-24 | –C$_6$H$_3$(CH$_3$)–C$_2$H$_4$COOCH$_3$ |
| (b)-25 | –C$_6$H$_4$–OCH$_2$COOC$_2$H$_5$ |
| (b)-26 | –C$_6$H$_4$–SO$_2$NHC$_3$H$_6$OC$_2$H$_5$ |

Blending ratio of at least one of the compounds in the formula (I) and at least one of the compounds in the formula (II) may be adequately chosen according to the desired characteristics of the objective disperse dye composition. Ordinarily, the ratio is 99–1% by weight to 1–99% by weight calculated as the pure compounds, preferably 90–10% by weight to 10–90% by weight, more preferably 80–20% by weight to 20–80% by weight.

Composition of the present invention may be prepared by blending at least one compound of the formula (I) with at least one compound of the formula (II) in a definite amount ratio depending on the desired usages, according to a well-known process. For the purpose of hue adjusting or others, the composition may further contain a dispersing agent, weighting agent, pH adjusting agent, dispersion level dyeing agent, dyeing auxiliary, solvent, resin binder, or the like, besides the compounds of the formula (I) and formula (II).

The present compositions made by blending a benzodifuranone compound and an anthraquinone compound are useful for dyeing hydrophobic materials, such as polyester, triacetate, diacetate, polyamide and polycarbonate materials, as disperse dyes and sublimation transfer type heat-sensitive recording colors. Particularly, the compositions of the present invention are useful as red disperse dyes for dyeing or printing hydrophobic fiber materials.

When the present composition is used as a disperse dye, it may be in the form of a liquid product which is obtained by mixing wet cakes of the compound of the formula (I) and of the compound of the formula (II) from the respective manufacturing processes with a single or mixed dispersing agents such as naphthalenesulfonate-formalin condensate and ligninsulfonic acid, and finely dispersing the mixture, for example, by a sand mill, or, alternatively, in the form of a powder or granular product obtained by drying the liquid product.

For dyeing hydrophobic fiber materials, a composition of the present invention is dispersed in an aqueous medium to make a dyeing bath, and a hydrophobic fiber material is dipped in the dyeing bath, after addition of a pH adjusting agent, a dispersion level dyeing agent, etc., if required. In case of polyester fiber materials, the dyeing is conducted under a pressurized condition at a temperature of not lower than 100° C., preferably 105°–140° C., for 30–60 minutes. The time period may be shortened or extended depending on the dyeing affinity.

Alternatively, the dyeing may be carried out in the presence of a carrier, such as o-phenylphenol methylnaphthalene, at a relatively high temperature, for example, under a water-boiling condition.

Furthermore, such a dyeing process in which a dye dispersion is padded onto a cloth may be conducted, followed by a steaming at a temperature of 100° C. or higher, or a dry-heating treatment.

For printing, a dye dispersion may be kneaded with a suitable paste, and the resulting color paste is printed on a fiber material and then subjected to a steaming or dry-heating treatment. Alternatively, the printing may be effected by an ink-jet process.

The hydrophobic fiber materials include polyester fiber, triacetate fiber, diacetate fiber, and polyamide fiber materials. As for mixed spun or combinedly woven textiles, those from a few kinds of such fiber materials, or those from such a fiber material with a natural fiber material, such as cellulose, wool and silk, may be mentioned. The present compositions are particularly useful for dyeing or printing polyester fiber materials.

The compositions of the present invention exhibit excellent dyeing characteristics and fastnesses, when used as disperse dyes for dyeing or printing hydrophobic fiber materials. Specifically, the present compositions exhibit various dyeing characteristics, particularly excellent pH dependency, dyeing bath stability, good level dyeability, and excellent light fastness, which are derived from the compounds represented by the formula (II), while reserving the characteristices in fastnesses, particularly excellent washing fastness, which are derived from the compounds represented by the formula (I), as well as excellent tarring and build-up due to the synergistic effects from the both compounds. Further, they can advantageously be used for blend dyeings, since they exhibit excellent performance as a component of the three primary colors.

The present invention will more fully be explained in reference to the following examples, which are, however, only illustrative and never construed to be limitative. In these examples, "part" means "part by weight" and " %" represents "% by weight".

EXAMPLE 1

A mixture of 0.7 part of the compound (a)-1 in Table 1, 0.3 part of the compound (b)-13 in Table 2, and 3.0 parts of a sodium naphthalenesulfonate-formalin condensate was finely dispersed in 6.0 parts of water to obtain an aqueous composition. The composition was diluted with water to make 1,000 parts of a dispersion. Using the dispersion, a polyester fiber textile was dyed according to the following conditions. The dyed product had an even color without blotches and exhibited good dyeing reproducibility, satisfactory pH dependency and dyeing bath stability, together with good tarring and color yield. The results are shown in Table 4.

For the comparison, each 1,000 parts of a dispersion prepared by finely dispersing a mixture of each 1.0 part of the compound (a)-1, (b)-17 or (b)-26, and 3.0 parts of sodium naphthalene-sulfonate-formalin condensate was used for the dyeing under the same conditions as above. The results are shown in Table 5 as Comparative Examples.

[Tests for pH dependency and dyeing bath stability]

① Preparation of dyed cloth-A

A 10.0 part portion of the above dye dispersion and 3.0 parts of SUMIPON TF (a dyeing auxiliary, manufactured by Sumitomo Chemical Co. Ltd.) were dispersed uniformly in water, and then 1.2 parts of acetic acid and 4.8 parts of sodium acetate were added thereto, to make a dyeing bath of 3,000 parts amount in total. Into the dyeing bath thus prepared was dipped 100 parts of a Tetron "tropical" cloth (a polyester fiber textile, manufactured by Toray Industries, Inc.), and the dyeing was effected by raising the temperature from 60° C. to 130° C. in a 1° C./minute rate, and then holding the temperature at 130° C. for 60 minutes. Thereafter, the bath was cooled down to below 90° C., and the dyed cloth was taken out of the bath, washed with water, subjected to a reduction-rinsing, washed again with water, and dried, to obtain a dyed cloth-A.

② Preparation of dyed cloth-B

Dyeing was conducted in similar way as in ①, except that 4.8 parts of disodium hydrogen-phosphate was added, in place of the sodium acetate, to obtain a dyed cloth-B.

③ Preparation of dyed cloth-C

The dyeing bath prepared in similar way as in ① was treated in a high temperature, high pressure dyeing machine at 140° C. for 30 minutes, and then cooled down to 90° C. A hundred parts of Tetron "tropical" cloth was placed in the bath and subjected to a dyeing under the same conditions as in ① to obtain a dyed cloth-C.

④ Determination of pH dependency

Differences in dyeing performances and hues between the cloth-A and cloth-B, dyed in ① and ②, respectively, were determined with the eye. The determination was done according to the following criteria.

⊚ Almost no difference observed in dyeing performance and/or hue.

○ Some difference observed in dyeing performance and/or hue.

Δ Difference observed in dyeing performance and/or hue.

× Significant difference observed in dyeing performance and/or hue.

⑤ Determination of dyeing bath stability

Differences in dyeing performances and hues between the cloth-A and cloth-C, dyed in ① and ③, respectively, were determined with the eye. The determination was done according to the following criteria.

⊚ Almost no difference observed in dyeing performance and/or hue.

○ Some difference observed in dyeing performance and/or hue.

Δ Difference observed in dyeing performance and/or hue.

× Significant difference observed in dyeing performance and/or hue.

[Tests for light fastness]

Using the clothes dyed as above, the light fastnesses were estimated according to JIS L-0843 method (exposed for 80 hours under a xenon arc lamp). The determination was done according to the following criteria.

⊚ Almost no discoloration observed.

○ Some discoloration observed.

Δ Discoloration observed.

× Significant discoloration observed.

[Tests for washing fastness]

Using the clothes dyed as above, the washing fastnesses were estimated according to the Mark & Spencer method (bath ratio, 50:1; temperature, 60±2° C.; time period, 30 minutes). The determination was done according to the following criteria.

⊚ Almost no pollution observed on the mutifiber.

○ Some pollution observed on the multifiber.

Δ Pollution observed on the multifiber.

× Significant pollution observed on the multifiber.

The results are shown in Table 4.

EXAMPLES 2 THROUGH 8

In similar way as in Example 1, compositions were made using (a)-1 or -2 compound with (b)-9, -13, -17, -21, -24 and/or -26 compound, and dyeing were conducted using the resulting compositions. The results are shown in Tables 4 and 5.

These compositions exhibit excellent tarring and color yield, and it is apparent from these results that the compositions give effective pH dependencies, dyeing bath stabilities and fastnesses to light and washing.

EXAMPLE 9

In similar way as in Example 1, six dyeing baths were prepared, and each 100 parts of a Tetron "tropical" cloth was put into each bath. Every 3 baths was fixed to each of two sets of Color Pet Dyeing Machine (manufactured by NIHON SENSHOKU KIKAI KABUSHIKI KAISHA) for the dyeing under the same conditions as in ① above. All of the resulting dyed clothes had even colorings with the same concentrations and hues, thus, exhibiting an excellent dyeing reproducibility with no differences among dyeing machines used.

TABLE 4

| Examples | Compound No. | Amount used | pH dependency | Dyeing bath stability | Fastnesses light | Fastnesses washing |
|---|---|---|---|---|---|---|
| 1 | (a)-1 | 0.9 | ○ | ○ | ○ | ⊙ |
|   | (b)-13 | 0.1 | | | | |
| 2 | (a)-1 | 0.7 | ○ | ○ | ○ | ⊙ |
|   | (b)-17 | 0.3 | | | | |
| 3 | (a)-1 | 0.5 | ○ | ○ | ⊙ | ⊙ |
|   | (b)-24 | 0.5 | | | | |
| 4 | (a)-2 | 0.3 | ⊙ | ⊙ | ⊙ | ○ |
|   | (b)-26 | 0.7 | | | | |
| 5 | (a)-1 | 0.2 | ⊙ | ⊙ | ⊙ | ○ |
|   | (b)-9 | 0.8 | | | | |
| 6 | (a)-2 | 0.8 | ○ | ○ | ○ | ⊙ |
|   | (b)-21 | 0.2 | | | | |
| 7 | (a)-1 | 0.6 | ⊙ | ⊙ | ○ | ⊙ |
|   | (b)-13 | 0.3 | | | | |
|   | (b)-17 | 0.1 | | | | |

TABLE 5

| Examples | Compound No. | Amount used | pH dependency | Dyeing bath stability | Fastnesses light | Fastnesses washing |
|---|---|---|---|---|---|---|
| 8 | (a)-1 | 0.7 | ⊙ | ⊙ | ○ | ⊙ |
|   | (b)-26 | 0.2 | | | | |
|   | (b)-9 | 0.1 | | | | |
| Comparative Example 1 | (a)-1 | 1.0 | x | Δ | ○ | ⊙ |
| Comparative Example 2 | (b)-26 | 1.0 | ⊙ | ⊙ | ⊙ | x |
| Comparative Example 3 | (b)-17 | 1.0 | ⊙ | ⊙ | ⊙ | x |

What we claim is:

1. A composition comprising at least one compound selected from the class of compounds represented by the following formula (I):

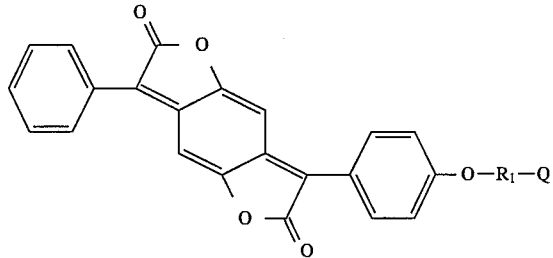

wherein $R_1$ represents a methylene, a straight or branched $C_2$–$C_6$ alkylene group, or a straight or branched $C_2$–$C_6$ alkylene group substituted with a hydroxy, $C_1$ to $C_4$ alkoxy, or $C_1$ to $C_4$ alkylcarbonyloxy group; Q represents a 5 or 6 membered heterocyclic ring having at least one hetero atom selected from the group consisting of O, S and N; and at least one compound selected from the class of compounds represented by the formula (II):

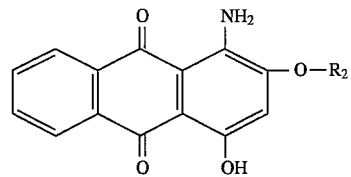

wherein $R_2$ represents (i) $C_1$–$C_6$ alkyl, (ii) $C_1$–$C_6$ alkyl substituted with a hydroxy, $C_1$–$C_4$ alkoxycarbonyloxy, $C_1$–$C_4$ alkoxy-$C_1$–$C_4$alkoxy, phenyl, phenoxy, phenoxycarbonyloxy, or aminophenylcarbonyloxy group, (iii) phenyl, or (iv) phenyl substituted with a halogen atom, $C_1$–$C_4$ alkyl, $C_1$–$C_4$ alkoxy, hydroxy, $C_1$–$C_4$ alkoxycarbonyl, $C_1$–$C_4$ alkoxycarbonyl-$C_1$–$C_4$ alkyl, oxopiperidino-$C_1$–$C_4$ alkyl $C_1$–$C_4$ alkylcarbonyl $C_1$–$C_4$ alkoxy, $C_1$–$C_4$ alkoxycarbonyl-$C_1$–$C_4$ alkoxy, hydroxy$C_1$–$C_4$ alkylthio, phenyl-$C_1$–$C_4$alkoxy, phenyoxy $C_1$–$C_4$alkoxy, $C_1$–$C_4$alkoxy $C_1$–$C_4$alkylaminosulfonyl, or $C_1$–$C_4$alkylphenylsulfonyloxy group.

2. A composition according to claim 1, wherein said composition contains 99–1% by weight of at least compound selected from the class of compounds represented by said formula (I), and 1–99% by weight of at least one compound selected from the class of compounds represented by said formula (II).

3. A composition according to claim 1, wherein said composition contains 90–10% by weight of at least compound selected from the class of compounds represented by said formula (I), and 10–90% by weight of at least one compound selected from the class of compounds represented by said formula (II).

4. A composition according to claim 1, wherein said composition contains 80–20% by weight of at least compound selected from the class of compounds represented by said formula (I), and 20–80% by weight of at least one compound selected from the class of compounds represented by said formula (II).

5. A composition according claim 1, wherein Q is selected from the group consisting of a tetrahydro-furyl, tetrahydrothienyl, pyrrolidyl, piperidyl, piperazyl, mopholyl, tetrahydropropanyl, and tetrahydropropanyl substituted with a $C_1$–$C_4$ alkyl group.

6. A composition according to claim 1, wherein Q is selected from the group consisting of furyl, thienyl, pirolyl, pyridyl, pyranyl, thiazolyl and S-triazinyl.

7. A composition according to claim 1, wherein Q is substituted with a member selected from the group consisting of a hydroxy, $C_1$–$C_4$ alkyl, $C_1$–$C_4$ alkoxy, $C_1$–$C_4$ alkylcarbonyl, $C_1$–$C_4$ alkoxycarbonyl, cyano, amino and keto group.

8. A method of dyeing a hydrophobic material comprising applying a composition according to claim 1 to said hydrophobic material.

* * * * *